United States Patent
Wang

(10) Patent No.: US 9,426,149 B2
(45) Date of Patent: Aug. 23, 2016

(54) MOBILE SECURE LOGIN SYSTEM AND METHOD

(71) Applicant: Ynjiun Paul Wang, Cupertino, CA (US)

(72) Inventor: Ynjiun Paul Wang, Cupertino, CA (US)

( * ) Notice: Subject to any disclaimer, the term of this patent is extended or adjusted under 35 U.S.C. 154(b) by 58 days.

(21) Appl. No.: 14/586,582

(22) Filed: Dec. 30, 2014

(65) Prior Publication Data

US 2016/0191506 A1    Jun. 30, 2016

(51) Int. Cl.
*H04L 29/06* (2006.01)
*G06F 21/35* (2013.01)
*G06F 21/36* (2013.01)

(52) U.S. Cl.
CPC ............ *H04L 63/0853* (2013.01); *G06F 21/35* (2013.01); *G06F 21/36* (2013.01); *H04L 63/0884* (2013.01); *H04L 63/08* (2013.01); *H04L 63/083* (2013.01)

(58) Field of Classification Search
CPC ... H04L 63/08; H04L 63/083; H04L 63/0853; H04L 63/0884; H04L 9/32; H04L 9/3226; G06F 21/30; G06F 21/31; G06F 21/35; G06F 21/36
See application file for complete search history.

(56) References Cited

U.S. PATENT DOCUMENTS

| | | | |
|---|---|---|---|
| 2013/0173915 A1* | 7/2013 | Haulund | H04L 9/3226 713/159 |
| 2013/0238455 A1* | 9/2013 | Laracey | G06Q 20/108 705/21 |

* cited by examiner

*Primary Examiner* — Morshed Mehedi
*Assistant Examiner* — Ayoub Alata

(57) ABSTRACT

A mobile secure login method comprises steps of 1) displaying a machine readable graphic form encoded with a sign in URL and a unique token on a browser, wherein the said machine readable graphic form comprises at least one of a 1D barcode, a 2D barcode, a PDF417, an QR code, a Data Matrix code, an Aztec code, and OCR symbol; 2) scanning the said machine readable graphic form using a mobile device; 3) transmitting the sign in credential with the said unique token to a server at the said sign in URL from the said mobile device, wherein the said sign in credential comprises at least one of a username, a password, and a PKI signed challenge; 4) authenticating the said sign in credential at the said server to enable the said browser login to a secure website automatically.

3 Claims, 9 Drawing Sheets

MOBILE SECURE LOGIN SYSTEM AND METHOD

BACKGROUND

Identity fraud on the Internet has become more prevalent in recent years. The source of fraud is primarily due to insecure passwords, phishing and keyloggers. To address the issue of insecure passwords, many websites have now encouraged users to include combinations of letters, numbers and symbols into their password. Therefore creating and remembering multiple secure passwords is a huge burden for a typical Internet user, especially for seldom used accounts. However, these secure passwords can be undermined by keyloggers, malware that record everything that a user types on a computer.

Although there are plenty of browsers that offer to "remember" your usernames and passwords in the browser, this practice is usually not recommended by security experts, as the computers and browsers are vulnerable to attacks by viruses and other malware.

Other secure Apps on a mobile phone such as eWallet, Password ABC, etc. cannot sign in a user to a website open in a browser on another device such as a PC. Mobile apps such as Password ABC only allows the device to login the website on the same mobile device. But if a user wishes to login to a website on a separate device such as a PC, the user still needs to search for the proper username and password in these Apps and then manually type in the username and password into the PC website to login the site. If a user would like to use a public PC to login a secure site, there is no guarantee that her/his username and password will remain private, as it could be captured by a keystroke logging malware, for example. Thus rendering these secure mobile apps no more secure than a user's own memory.

SUMMARY

In one aspect, the invented secure mobile login method enables the user to login to a secure website on a computer (e.g. a Personal Computer) without manually entering a username and password. This is accomplished by using a mobile device to scan a barcode displayed on the webpage.

Additionally, after using a mobile device to scan a barcode displayed on the webpage, the invented method automatically matches the website with a proper credential that is securely stored in the mobile device and upon user's permission then transmits to the website server for authentication.

Furthermore, once the website server has authenticated the mobile secure login credentials transmitted from a user mobile device, the current invented method enables the browser or client on the computer to be notified through either a pushing or pulling message to automatically advance into a secure webpage without a key press or a mouse click on the computer, that is, without human intervention.

In another aspect, the invented secure mobile login method does not require a user to type in his/her credentials (e.g. a username and a password) on a computer, therefore it would not be subject to keylogging attacks.

Yet another aspect, the invented secure mobile login method will automatically check the validity of the website before submitting the user credentials to the website server thus avoiding a potential phishing attack.

Furthermore, the current invented method enables extremely long periodically random generated password as a mobile secure login credential, which is almost impossible for a human being to remember, thus enhancing security dramatically.

Additionally, the invented method enables the use of Public Key Infrastructure (PKI) signed challenge as a mobile secure login credential which also significantly enhances the login security.

DETAILED DESCRIPTION

Figure 1:
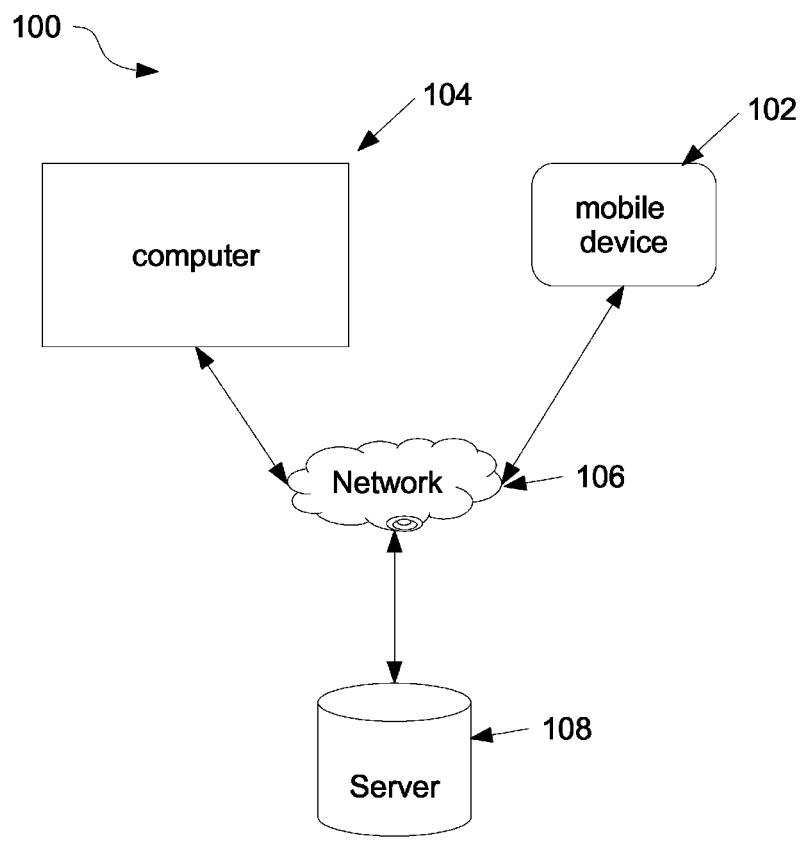
FIG. 1 illustrates one embodiment of a mobile secure login system.

FIG. 1 is a schematic block diagram illustrating an example system 100 for a mobile secure login system. In this example, the system 100 includes a network 106, a mobile device, such as a smart phone 102, a computer 104, and a web server 108. In the example system, the computer 104 and the web server 108 are in communication via the network 106 using wired and/or wireless communication schemes such as Internet. Similarly, the mobile device 102 and the web server 108 are in communication via the network 106 using wired and/or wireless communication schemes such as Internet.

Figure 2:
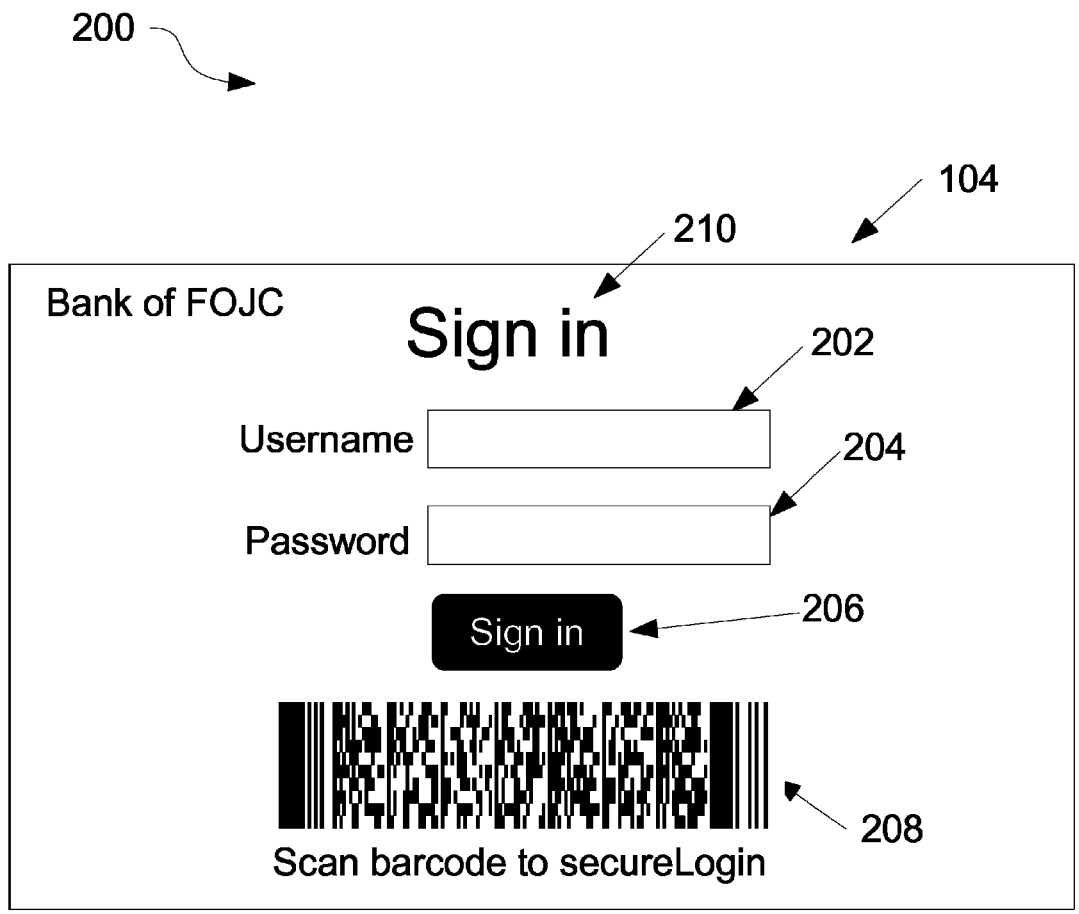
FIG. 2 illustrates one embodiment of a sign in page of a website on a browser running in a computer.

Referring to FIG. 1 and FIG. 2, a user may run a web browser in the computer 104 to login a secure web site at the server 108. A typical way of login to a secure website, for example, is to type in a username 202 and a password 204 at the sign in page 210 and click on "Sign in" button 206 as shown in FIG. 2. The current invention method provides an alternative secure way to login to the secure web site without typing in a username 202, a password 204, and clicking the "Sign in" button 206 in the computer 104. Instead, a user can pull out her/his mobile device 102, such as a smart phone, and scan a barcode 208 displayed in the web browser running on the computer 104.

Figure 3:
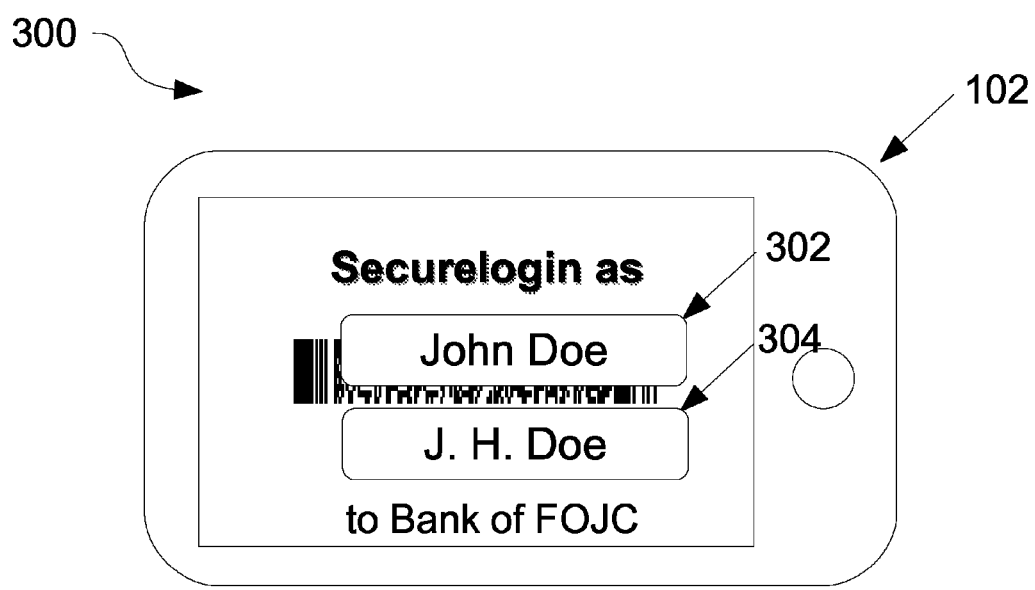
FIG. 3 illustrates a view of one embodiment of a mobile secure login app running in a mobile device.

Referring to the FIG. 3, after a user scans the barcode 208 as shown in FIG. 2, a mobile device 102 displays, for example, two accounts: John Doe 302, J. H. Doe 304, for the user to select to login to the secure website.

Figure 4:
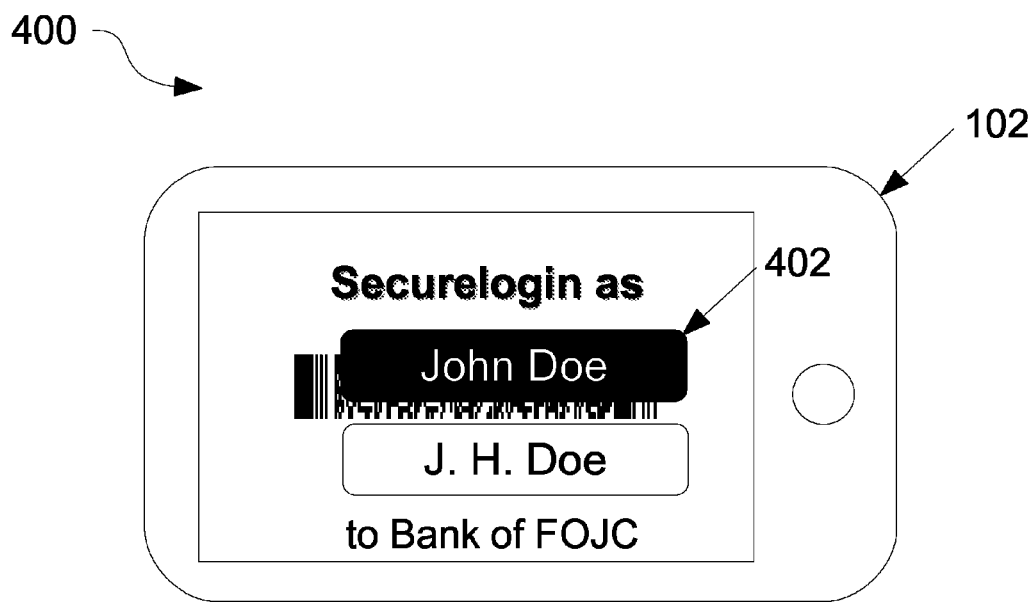
FIG. 4 illustrates a selected account for login view of one embodiment of a mobile secure login app running in a mobile device.
Figure 5:
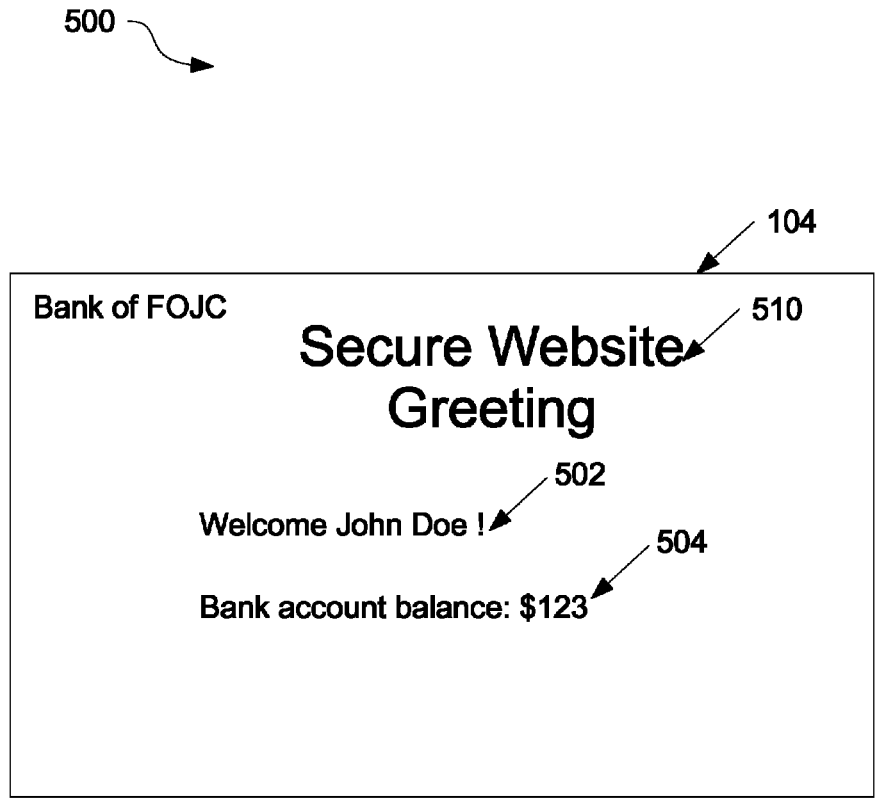
FIG. 5 illustrates one embodiment of a secure page of a website after login on a browser running in a computer using a mobile device.

Referring to the FIG. 4 and FIG. 5, once the user selects John Doe 402 on the mobile device 102, the browser in the computer 104 automatically advances the user into the secure website 510 with greeting message to John Doe 502 and a private message 504 for the user's account summary, for example.

Figure 6:
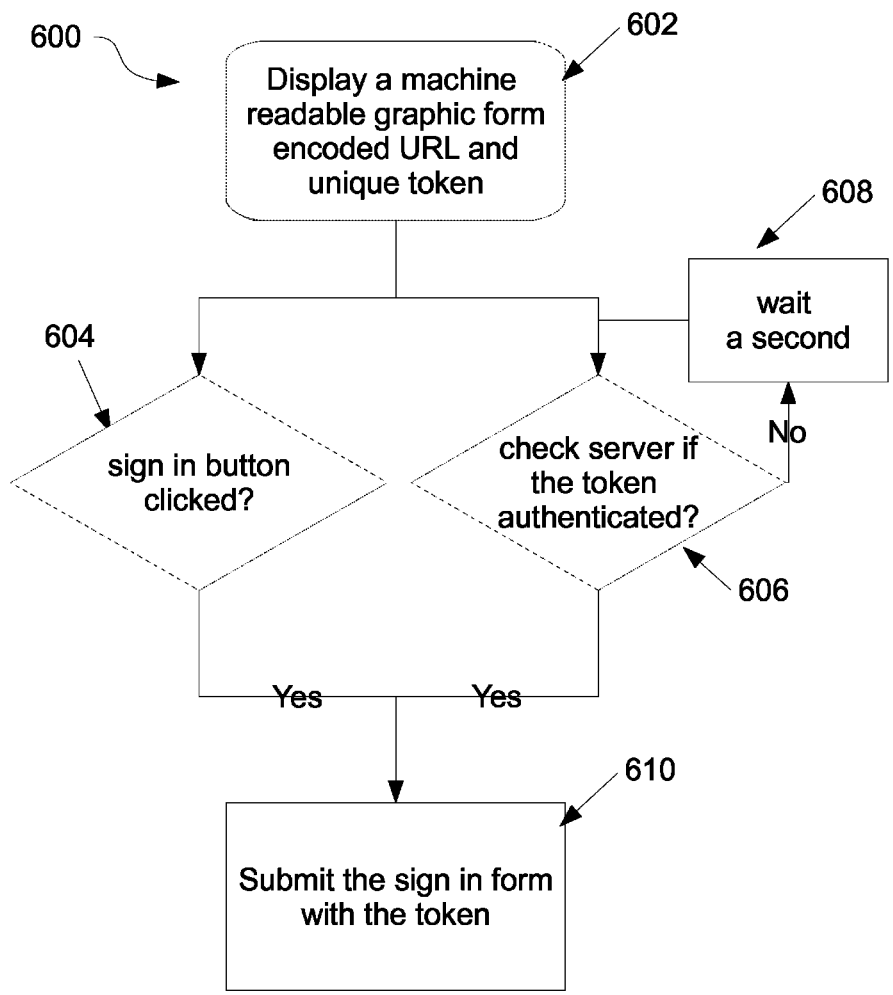
FIG. 6 is a flow chart of an example method of the operation of a browser running in a computer.

FIG. 6 illustrates a flow chart of an example method 600 of the steps of operation of a browser running in a computer 104. In step 602, a browser displays a machine readable graphic form which encodes a sign in URL and a unique token. One of the preferred embodiments is to embed the machine readable graphic form encoder in Javascript code in the webpage HTML code for the browser to render the machine readable graphic form in the computer 104. Another preferred embodiment is to render the machine readable graphic form in the server 108 and transmit the image of the machine readable graphic form to the browser to display in the computer 104. The machine readable graphic form is one of a 1D barcode, a 2D barcode, a PDF417, a QR code, a Data Matrix code, an Aztec code, and OCR symbol. A sign in URL, for example, may be a RESTful API like "https://fojc.net/signin" at the server 108. A unique token, for example, could be a randomly generated UUID or a hash of session ID by the server 108. The unique token is associated with the current sign in page session at the browser in the computer 104.

In step 604, a typical way of login to a secure website, the browser is activated by clicking "Sign in" button 206. Then it goes to step 610 to submit the username and the password filled in by the user in the sign in form together with the unique token to the server 108 at the sign in URL.

In step 606, alternatively, in parallel of step 604, the browser running in the computer 104 will automatically check the server in the background periodically to see if the session associated with the unique token has been authenticated or not. If not yet, the browser will go to step 608 and wait for a predetermined period of time in the background, for example, a second, and then tries the step 606 again. If the session associated with the unique token has been authenticated, then it will go to step 610 to submit an empty sign in form with the unique token to the sign in URL. One of the preferred embodiments of step 606 is to use jQuery.Ajax (Asynchronous HTTP) request as shown in the example Code List 1 below. Another preferred embodiment is to use Comet model. When a particular token has been authenticated by a mobile device, the server 108 can push the authenticated event to notify the browser.

---
Code List 1
---

```
<script type="text/javascript">
    var timelimit = 1000; //1000 ms = 1 sec
    window.onload=function( ){
        var auto = setTimeout(function( ){ autoRefresh( ); }, 100);
        var signin_url = '<%= @signin_url.to_s %><%= @securelogin.token.to_s %>.json';
        function submitform( ){
            document.forms["myForm"].submit( );
        }
        function autoRefresh( ){
        clearTimeout(auto);
        auto = setTimeout(function( ){
            //check server if securelogin.autheticated is true using
            jQuery.Ajax request
            $.get(signin_url, function(data) {
                var authenticated =
                $.parseJSON(JSON.stringify(data));
                if (authenticated) {
                    submitform( );
                }
            });
            autoRefresh( ); }, timelimit); //check the server every 1 sec
        }
    }
</script>
```

Figure 7:
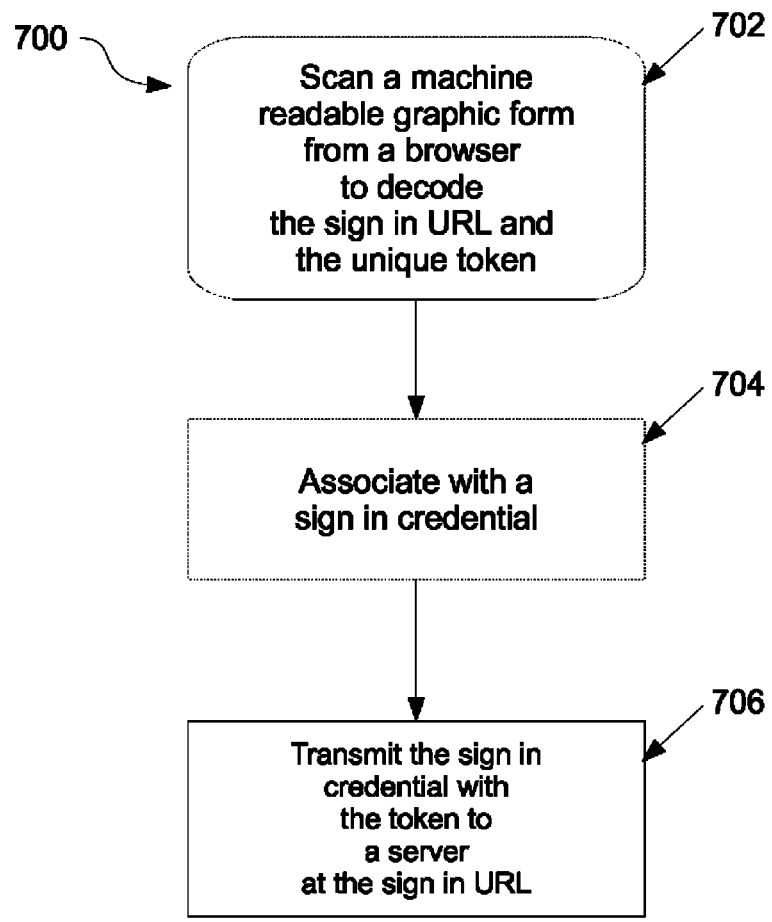
FIG. 7 is a flow chart of an example method of the operation of a secure login mobile app running in a mobile device.

FIG. 7 illustrates a flow chart of an example method 700 of the steps of operation of a secure login mobile app running in a mobile device 102. In step 702, a user scans the machine readable graphic form 208 at the sign in page 210, for example, using the secure login mobile app. The app decodes the machine readable graphic form and extracts the sign in URL and the unique token information.

In step 704, the app searches through the database in the mobile device for a sign in credential associated with the sign in URL. If more than one credential found to associate with the sign in URL, for example, a list of account names (e.g. John Doe 302, J. H. Doe 304) is presented as shown in FIG. 3 for the user to select. If no credential is found to associate with the sign in URL, for example, a sign in form will be presented to request the user to fill in a username and a password on the mobile device 102. The username and the password will be stored in the database in the app as a credential associated with the sign in URL.

In step 706, the mobile device 102 transmits the sign in credential (for example, a username and a password) and the unique token to a server 108 at the sign in URL. Another preferred embodiment of a credential is PKI (Public Key Infrastructure) signed challenge. For example, the server 108 can generate a random number as a challenge to request the mobile device 102 to digitally sign it using its private key. The signed challenge will be transmitted in step 706 as the sign in credential.

Figure 8:
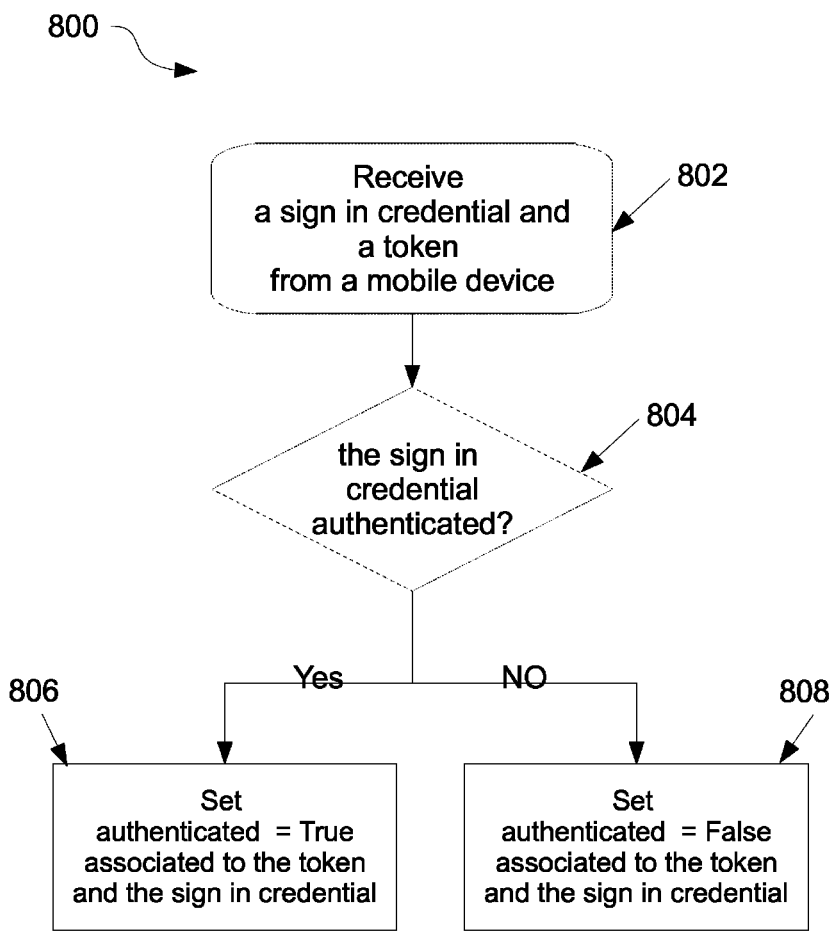
FIG. 8 is a flow chart of an example method of the authentication of a server when receiving a sign in credential and a token from a mobile device.

FIG. 8 illustrates a flow chart of an example method 800 of the steps of the authentication of a server when receiving a sign in credential and a token from a mobile device. In step 802, the server 108 receives a sign in credential and a token from the mobile device 102.

In step 804, the server 108 authenticates the sign in credential. For example, in one of the preferred embodiments, if a username and a password are received as the sign in credential, the server 108 will look up a user database using the username as a key and verify if the password hash is the same as the one stored in the database. If it is the same, it will go to step 806, otherwise go to step 808. In another preferred embodiment, a username and a PKI signed challenge is received as the sign in credential, the server 108 will look up a user database using username as a key and retrieve the user's public key to verify the PKI signed challenge. If the verification is passed, then it will go to step 806, otherwise go to step 808.

In step 806, the server 108 sets the authenticated flag equal to True in a securelogin database. The authenticated flag in the securelogin database is associated to the token and the sign in credential which is received at step 802.

In step 808, the server 108 sets the authenticated flag equal to False in a securelogin database. The authenticated flag in the securelogin database is associated to the token and the sign in credential which is received at step 802. In another preferred embodiment, the server simply associates the sign in credential to the token in the securelogin database if the authenticated flag was created with a default value of False.

Figure 9:
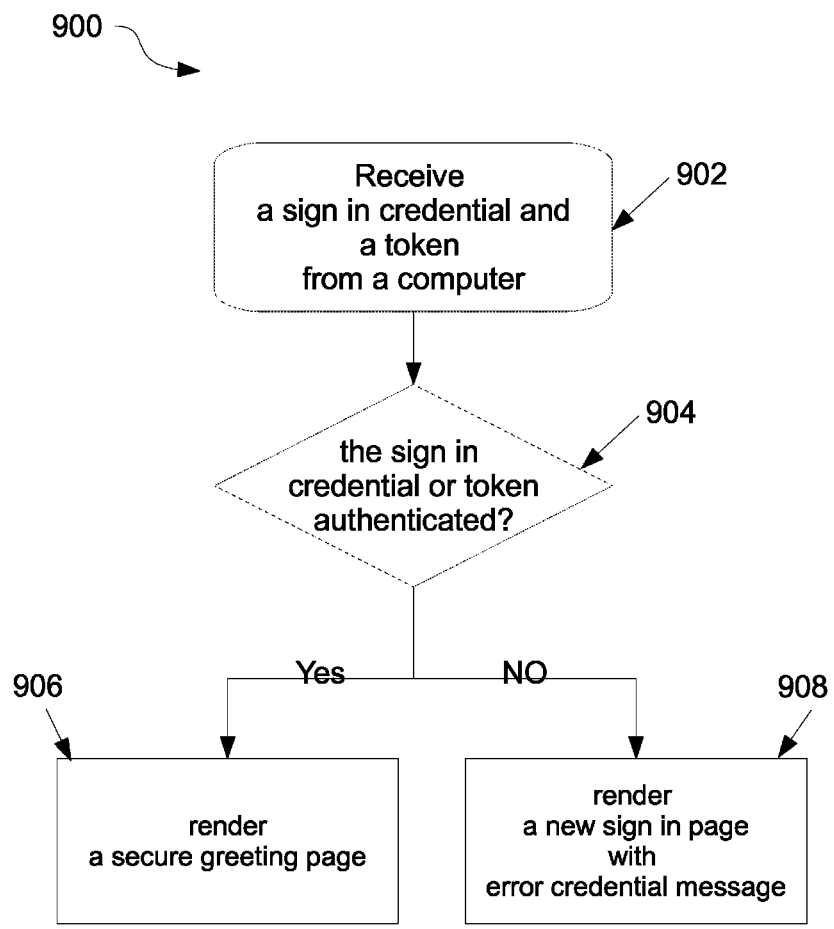
FIG. 9 is a flow chart of an example method of the authentication of a server when receiving a sign in credential and a token from a computer.

FIG. 9 illustrates a flow chart of an example method 900 of the steps of the authentication of a server when receiving a sign in credential and a token from computer. In step 902, the server 108 receives a sign in credential and a token from the computer 104.

In step 904, if the server 108 receives an empty sign in credential and a token, then the server will use the token as the key to look up the securelogin database for the associated authenticated flag and the associated sign in credential (e.g. a username). If the authenticated flag is True, then go to step 906, otherwise go to step 908. If the server 108 receives a non-empty sign in credential, for example a username and a password, then the server will look up a user database using username as a key and verify if the password hash is the same as stored in the database. If it is the same, then it will go to step 906, otherwise go to step 908.

In step 906, the server 108 renders a secure page to greet the user, for example, as shown in FIG. 5.

Figure 10:
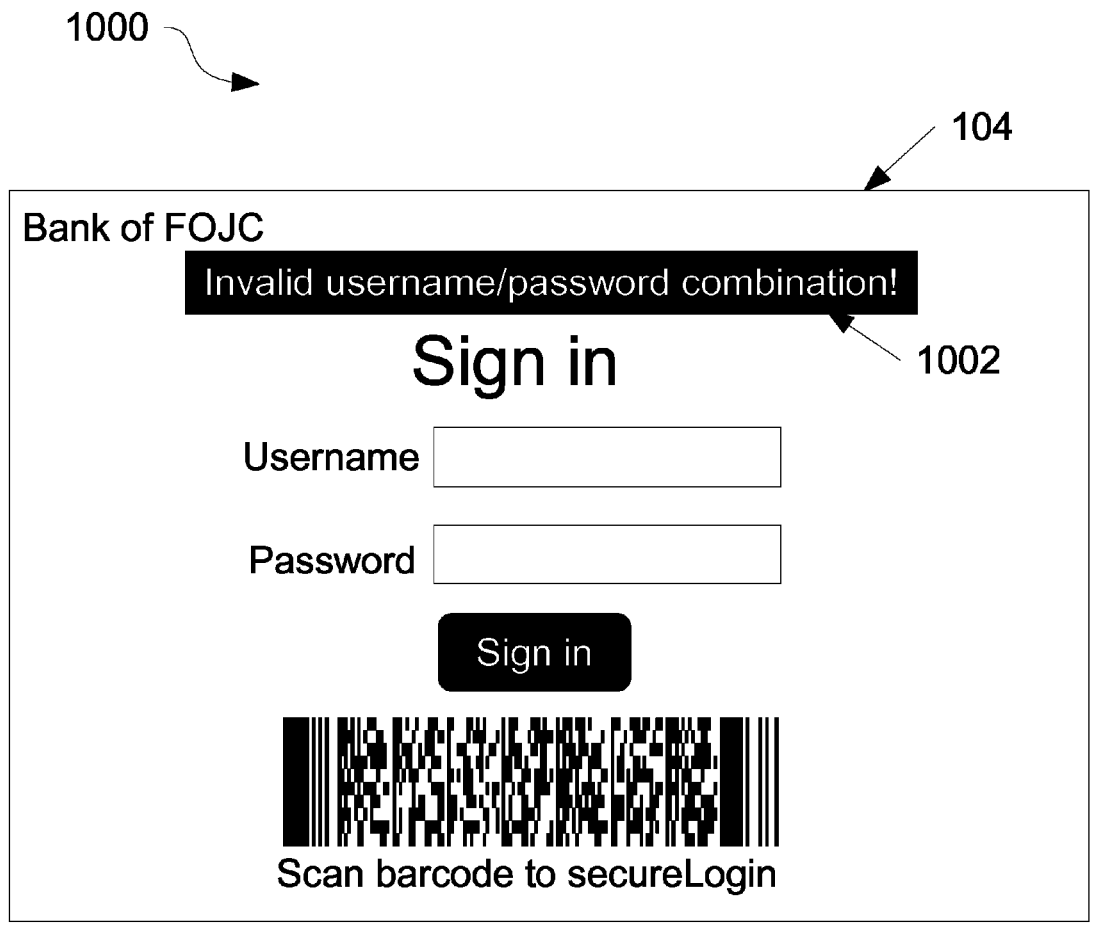
FIG. 10 illustrates one embodiment of a sign in page with an error message.

In step 908, the server 108 renders a new sign in page again with an error message, for example, "Invalid username/password combination" 1002 as shown in FIG. 10.

The flow diagrams depicted herein are just examples. There may be many variations to these diagrams or the steps (or operations) described therein without departing from the spirit of the disclosure. For instance, the steps may be performed in a differing order, or steps may be added, deleted or modified.

While embodiments have been described, it is understood that those skilled in the art, both now and in the future, may make various improvements and enhancements.

What is claimed is:

1. A method to login to a secure website using a mobile device comprising:
   store on said mobile device a plurality of credentials related to a plurality of accounts owned by a user;
   display a machine readable graphic form encoded with a sign in URL, and a unique token on a browser of a computing device, wherein said unique token is randomly generated by a server and associated with a sign in page session on said browser;
   scan said machine readable graphic form using said mobile device;
   decode by said mobile device said machine readable graphic and extract said sign in URL and said unique token;
   detect by said mobile device that said sign in URL is related to said a plurality of accounts owned by said user;
   display a list of said a plurality of accounts to said user on said mobile device to select at least one account;
   determine by said mobile device a sign in credential associated with said at least one selected account;
   transmit said sign in credential with said unique token to a server at said sign in URL from said mobile device;
   authenticate said sign in credential at said server to enable said browser to login to said secure website automatically.

2. A mobile secure login method, comprising:
   store on a mobile device a plurality of credentials related to a plurality of accounts owned by a user;
   display a machine readable graphic form encoded with a sign in URL and a unique token on a browser, wherein said machine readable graphic form comprises at least one of a 1D barcode, a 2D barcode, a PDF417, an QR code, a Data Matrix code, an Aztec code, and OCR symbol, and wherein said unique token is randomly generated by a server and associated with a sign in page session on said browser;
   scan said machine readable graphic form using a said mobile device;
   decode by said mobile device said machine readable graphic and extract said sign in URL and said unique token;
   detect by said mobile device that said sign in URL is related to said a plurality of accounts owned by said user;
   display a list of said plurality of accounts to said user on said mobile device to select at least one account;
   determine by said mobile device a sign in credential associated with said at least one selected account;
   transmit said sign in credential with said unique token to a server at said sign in URL from said mobile device, wherein said sign in credential comprises at least one of a username, a password, and a PKI signed challenge;
   authenticate said sign in credential at said server to enable said browser to login to a secure website automatically.

3. A mobile secure login system, comprising:
   a mobile device capable of storing a plurality of credentials related to a plurality of accounts owned by a user;
   a computer capable of displaying a machine readable graphic form encoded with a sign in URL of a secure website and a unique token on a browser, wherein said unique token is randomly generated by a server and associated with a sign in page session on said browser;
   said mobile device capable of scanning and decoding a machine readable graphic form;
   said mobile device capable of decoding said machine readable graphic and extract said sign in URL and said unique token;
   said mobile device capable of detecting that said sign in URL is related to said a plurality of accounts owned by said user;
   said mobile device capable of displaying a list of said a plurality of accounts to said user to select at least one account;
   said mobile device capable of determining a sign in credential associated with said at least one selected account; and
   said mobile device capable of transmitting said sign in credential with said unique token to a server at a said sign in URL;
   a server at said sign in URL capable of receiving said sign in credential and said unique token, wherein, said server authenticates said sign in credential and said unique token from said mobile device to enable said browser in said computer to login to said secure website automatically.

\* \* \* \* \*